United States Patent
Landaberea Rodriguez et al.

(10) Patent No.: US 10,112,437 B2
(45) Date of Patent: Oct. 30, 2018

(54) ELASTIC WHEEL FOR RAILWAY VEHICLES

(71) Applicant: CONSTRUCCIONES Y AUXILIAR DE FERROCARRILES, S.A., Beasain (Guipuzcoa) (ES)

(72) Inventors: Jose Aitor Landaberea Rodriguez, Lasarte-Oria (ES); Jon Iartza Zubiria, Usurbil (ES); Iker Irizar Izaguirre, Antzuola (ES); Haritz Iztueta Arakama, Zerain (ES)

(73) Assignee: CONSTRUCCIONES Y AUXILIAR DE FERROCARRILES, S.A., Beasain (Guipuzcoa) (ES)

(*) Notice: Subject to any disclaimer, the term of this patent is extended or adjusted under 35 U.S.C. 154(b) by 124 days.

(21) Appl. No.: 14/417,341

(22) PCT Filed: Jul. 16, 2013

(86) PCT No.: PCT/ES2013/070513
§ 371 (c)(1),
(2) Date: Jan. 26, 2015

(87) PCT Pub. No.: WO2014/020203
PCT Pub. Date: Feb. 6, 2014

(65) Prior Publication Data
US 2015/0197119 A1    Jul. 16, 2015

(30) Foreign Application Priority Data

Jul. 30, 2012   (ES) .................................. 201231225

(51) Int. Cl.
B60B 17/00    (2006.01)

(52) U.S. Cl.
CPC ...... *B60B 17/0034* (2013.01); *B60B 17/0044* (2013.01); *B60B 17/0048* (2013.01);
(Continued)

(58) Field of Classification Search
CPC ............ B60B 17/0034; B60B 17/0048; B60B 17/0044
(Continued)

(56) References Cited

U.S. PATENT DOCUMENTS

| 623,883 A | * | 4/1899 | Cameron | ............ B60B 17/0034 295/11 |
| 2,113,379 A | * | 4/1938 | Maas | .................. B60B 17/0044 16/107 |

(Continued)

FOREIGN PATENT DOCUMENTS

| DE | 2428078 A1 | 12/1975 |
| DE | 3328321 A1 | 2/1985 |

(Continued)

OTHER PUBLICATIONS

IPRP/Written Opinion dated Feb. 5, 2015 along with the English translation thereof for the PCT Application No. PCT/ES2013/070513.

*Primary Examiner* — Jason R Bellinger
*Assistant Examiner* — Scott A Browne
(74) *Attorney, Agent, or Firm* — Lucas & Mercanti, LLP

(57) ABSTRACT

The present invention relates to an elastic wheel for railway vehicles, formed by a tread (1) and a wheel center (2), defining a housing for the insertion of an elastomer that is compressed by a retaining ring (3) which is attached to the wheel center (2) by means of attachment screws (4), and in which the elastomer is formed by a plurality of V-shaped elastic blocks (5), having two oblique walls belonging to the wheel center (2) and to the retaining ring (3), respectively, forming an angle of between 48° and 52° with respect to the axis (R) of the wheel, and in which the oblique walls end in respective inclined sections on which the vertices of the V-shaped elastic blocks (5) are supported, said inclined (Continued)

sections forming an angle of between 2° and 10° with respect to the axis (R) of the wheel.

3 Claims, 3 Drawing Sheets

(52) U.S. Cl.
CPC ..... *B60B 17/0068* (2013.01); *B60B 2900/112* (2013.01); *B60B 2900/113* (2013.01); *B60B 2900/131* (2013.01); *B60B 2900/133* (2013.01); *B60B 2900/311* (2013.01)

(58) Field of Classification Search
USPC ........................................ 295/7, 11
See application file for complete search history.

(56) References Cited

U.S. PATENT DOCUMENTS

| | | | | |
|---|---|---|---|---|
| 2,667,767 A * | 2/1954 | Burrell | ............... | B60B 17/0034 29/239 |
| 3,797,895 A * | 3/1974 | Tomizawa | ......... | B62D 55/0966 152/49 |
| 4,458,966 A * | 7/1984 | Stensson | ................... | B60B 9/16 295/11 |
| 5,183,306 A * | 2/1993 | Emilsson | ............ | B60B 17/0044 295/11 |
| 5,702,141 A * | 12/1997 | Broucke | ............. | B60B 17/0044 295/11 |
| 6,375,243 B1 * | 4/2002 | Bradley | ................... | A63G 7/00 152/47 |
| 7,735,888 B2 * | 6/2010 | Murawa | ............. | B60B 17/0013 152/246 |
| 8,360,535 B2 * | 1/2013 | Johannsen | ......... | B62D 55/0966 305/137 |
| 2010/0283276 A1 * | 11/2010 | Wirth | ...................... | F16D 65/12 295/7 |

FOREIGN PATENT DOCUMENTS

| | | | | |
|---|---|---|---|---|
| DE | 19831926 A1 * | 1/2000 | ......... | B60B 17/0006 |
| DE | 102005040521 B4 * | 6/2007 | ......... | B60B 17/0006 |
| EP | 0489455 A1 | 6/1992 | | |
| EP | 0679540 A1 | 11/1995 | | |
| EP | 0864445 A2 * | 9/1998 | ......... | B60B 17/0048 |
| ES | 2128147 T3 | 5/1999 | | |
| ES | 2166845 T3 | 5/2002 | | |
| WO | WO 94/15801 | 7/1994 | | |
| WO | WO 95/20499 | 8/1995 | | |
| WO | WO 9839167 A1 * | 9/1998 | ......... | B60B 17/0013 |
| WO | WO 2006072278 A1 * | 7/2006 | ......... | B60B 17/0013 |

* cited by examiner

ELASTIC WHEEL FOR RAILWAY VEHICLES

CROSS REFERENCE TO RELATED APPLICATION

This Application is a 371 of PCT/ES2013/070513 filed on Jul. 16, 2013 which, in turn, claimed the priority of Spanish Patent Application No. P201231225 filed on Jul. 30, 2012, both applications are incorporated herein by reference.

FIELD OF THE ART

The present invention relates to an elastic wheel for railway vehicles, particularly designed for urban railway vehicles such as trams, subways or light rails.

STATE OF THE ART

Elastic wheels are commonly used in trams or in another type of railway vehicles which run primarily in urban areas. These wheels are designed for damping vibrations resulting from rolling and reducing the noise produced to the greatest possible extent.

Elastic wheels conventionally consist of an elastomer, in the form of a single annular block or in the form of a set of individual blocks, which is inserted in a housing defined between the tread, the wheel center, and a ring compressing the elastomer against the wheel center. The ring is usually fastened to the wheel center by means of a set of lock bolts.

The objective that is sought by means of the arrangement of the elastomer in the housing defined between the ring, the wheel center and the tread is to attain a suitable flexibility to vibration damping ratio.

There is a wide range of these elastic wheels on the market, for example, German patent DE 3,328,321 discloses an elastic wheel having an elastomer formed by a set of rubber blocks which are arranged in a virtually horizontal manner in the housing defined between the tread, the wheel center, and the retaining ring. In this case, the elastomer has a very open V shape with an angle of about 15° with respect to the horizontal, the horizontal being understood as a line approximately parallel to the axis of the wheel.

Such elastic wheels have low rigidity in the axial direction because the elastomer works under shear forces in that direction. Low axial rigidity has a negative influence on the dynamic behavior of the train and can cause early deterioration of the elastomer due to the high deformations experienced during service.

To improve rigidity of such elastic wheels in the axial direction, the solution disclosed in patent document WO 9520499 proposes inserting metal parts into the elastomer so that they can work under compression in the axial direction. In this regard, the solution of European patent document EP 679,540 is also known, which discloses having an elastomer formed by rubber-coated metal blocks that are alternated between blocks made of only rubber.

These two solutions improve rigidity of the elastic wheel in the axial direction by means of hardening the elastomer, but some of the damping properties are lost by reducing the amount of elastomer, and noise attenuation, which is one of the features inherent to elastic wheels, is therefore decreases. Furthermore, they are complex solutions that increase the cost of manufacturing the rubber blocks and the elastic wheel.

Another type of elastic wheel is proposed in European patent document EP 489,455, in which a V-shaped elastomer is inserted in the housing defined between the tread, the wheel center, and the retaining ring with an angle of 60° with respect to the horizontal. This solution assures high enough axial rigidity, but it has a complex geometry affecting the manufacturing cost. In this solution, the elastomer consists of a single annular block through which there extend screws attaching the wheel center and the retaining ring. This solution requires manufacturing a different mold for each elastic wheel design. Furthermore, it is a rather non-versatile solution, because a change in wheel diameter requires developing specific molds for manufacturing the single annular block of the elastomer. On the other hand, it is necessary to make grooves having a complex geometry to assure robust attachment between the elastomer and metal parts, which affects the cost of machining the metal parts.

Another solution for an elastic wheel is proposed in German patent document DE 2,428,078, which has an elastomer formed by two annular blocks that are virtually parallel to one another. In this case, the elastomeric material works under shear forces in the radial direction of the wheel, so its radial rigidity is lower. In this case, the elastic wheel is devised for very specific applications, where the wheel is subjected to low loads.

It is therefore necessary to develop an elastic wheel which has a simple and economic structure, and assures good axial and radial rigidity features.

OBJECT OF THE INVENTION

The present invention proposes an elastic wheel that can be applied to railway vehicles traveling in urban areas, such as subways, trams or light rails.

This elastic wheel object of the invention is formed by a tread and a wheel center defining a housing for the insertion of an elastomer that is compressed by a retaining ring which is attached to the wheel center by means of attachment screws, the elastomer being formed by a plurality of V-shaped elastic blocks.

The housing defined between the tread, the wheel center and the retaining ring, in which the elastic blocks are compressed, has two oblique walls belonging to the wheel center and to the retaining ring, respectively, forming an angle of between 48° and 52° with respect to the horizontal, and preferably an angle of 50°. In addition, the oblique walls of the wheel center and of the retaining ring end in respective inclined sections on which the vertices of the V-shaped elastic blocks are supported, said inclined sections forming an angle of between 2° and 10° with respect to the horizontal.

A simple and low-cost elastic wheel is thereby obtained, and given its constructive and functional features, said elastic wheel is preferably applied for the function for which it is intended, assuring good axial and radial rigidity conditions.

DETAILED DESCRIPTION OF THE INVENTION

Figure 1:
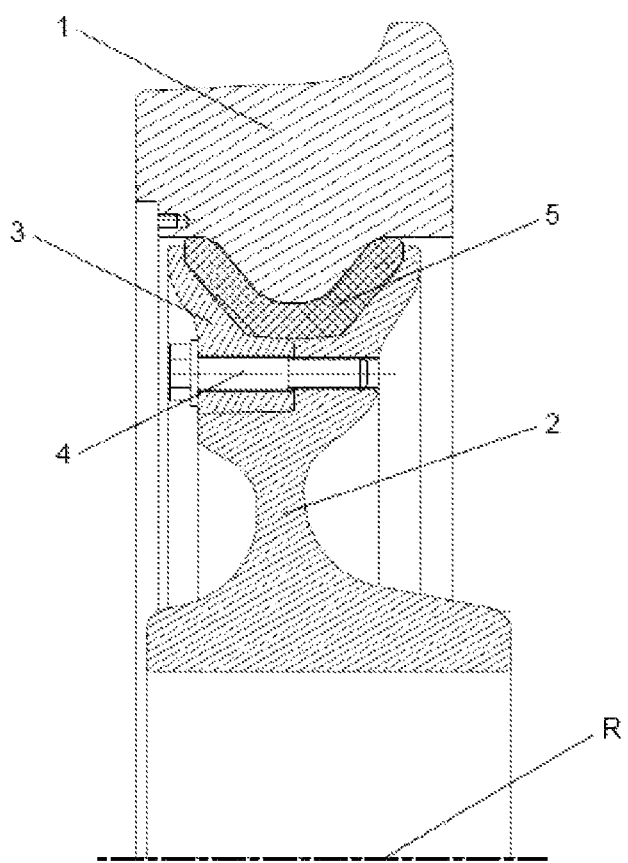
FIG. 1 shows a partial cross-section view of an elastic wheel according to the invention.
Figure 2:
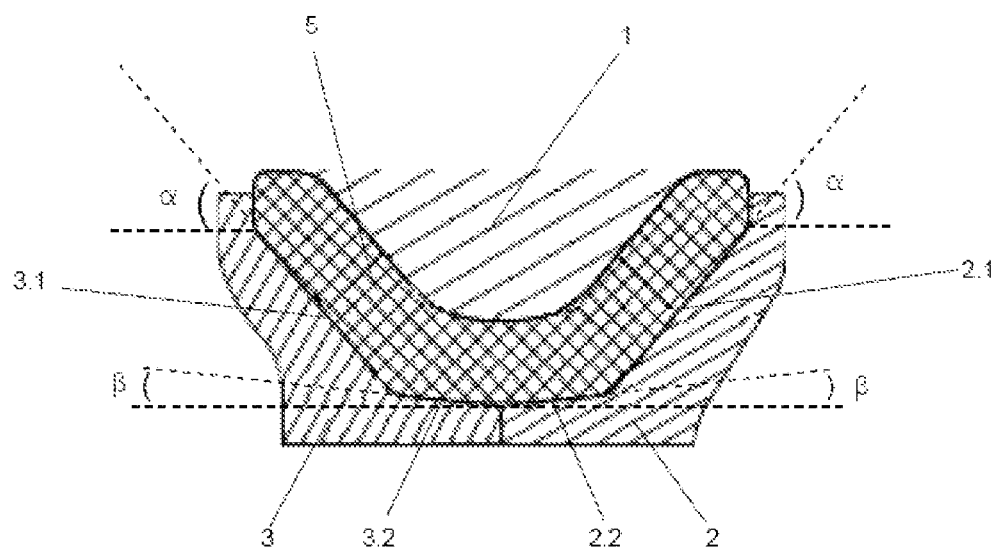
FIG. 2 is an enlarged detail of the housing in which the elastomer of the wheel is introduced.
Figure 3:
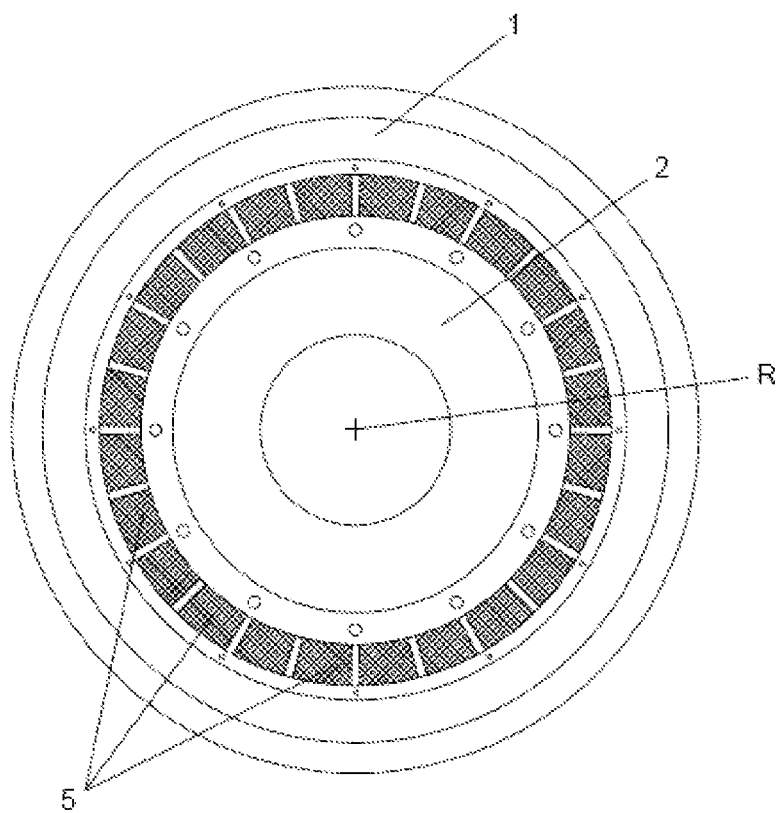
FIG. 3 shows a side view of the elastic wheel.

FIG. 1 shows a cross-section view of the set of elements forming the elastic wheel object of the present invention.

The elastic wheel has the form of a body of revolution generated about the axis (R) of the wheel and consists of a tread (1), which is the part of the wheel traveling on the running rail, and a wheel center (2) or wheel hub.

Between the tread (1) and the wheel center (2) there is defined a housing in which an elastomer is inserted under compression, said elastomer being retained by a ring (3) which is attached to the wheel center (2) by means of attachment screws (4) that do not interfere with the elastomer, being located below it. The elastomer retained in the housing is formed by a plurality of V-shaped blocks (5) made from a completely elastic material, providing the wheel with high damping capacity.

The housing where the elastic blocks (5) are compressed is defined by two oblique walls (2.1, 3.1) belonging to the wheel center (2) and to the retaining ring (3), respectively, each of said oblique walls (2.1, 3.1) having an angle ($\alpha$) of between 48° and 52° with respect to the horizontal, preferably an angle ($\alpha$) of 50°, which allows assuring good axial and radial rigidity of the elastic wheel, horizontal being understood as a line parallel to the axis (R) of the wheel.

Furthermore, the oblique walls (2.1, 3.1) of the wheel center (2) and the retaining ring (3) end in respective inclined sections (2.2, 3.2) forming an angle ($\beta$) of between 2° and 10° with respect to the horizontal. The vertices of the V-shaped elastic blocks (5) are supported on these inclined sections (2.2, 3.2) of the wheel center (2) and the retaining ring (3), such that assembly and disassembly of the elastic blocks (5) is made easier as a result of the slightly conical zone defined between them. It is thereby achieved that the elastic blocks (5) are more homogenously seated in the wheel center (2) and that the compression stress applied by the retaining ring (3) during assembly is also homogenous. Furthermore, this zone defined by the inclined sections (2.2, 3.2) prevents bends in the material of the elastic blocks (5).

With this arrangement of the elastic blocks (5), confined between the tread (1), the oblique walls (2.1, 3.1) and the inclined sections (2.2, 3.2) of the wheel center (2) and the retaining ring (3), minimum axial rigidity of 40 KN/mm is assured, and radial rigidity sufficient for bearing large loads during service is in turn assured.

The use of elastic blocks (5) provides enormous versatility and a huge competitive advantage with respect to elastic wheel solutions with a single annular block. In fact, it enables making significant changes to the wheel design without having to make a new mold; and by including a sufficient number of elastic blocks (5), behaviour during service is equivalent to that of said solutions with a single annular block.

Furthermore, the elastic blocks (5) are compressed between 20 and 30% with respect to their original size in the assembly arrangement, this high level of compression assuring a robust attachment between said elastic blocks (5) and the metal parts of the tread (1), wheel center (2) and retaining ring (3). Unwanted movements between parts during service are thereby avoided without having to machine complex grooves in metal parts.

The invention claimed is:

1. An elastic wheel for railway vehicles, comprising:
   a tread;
   a wheel center;
   an axis (R) at the center of the wheel;
   a retaining ring attached to the wheel center by means of attachment screws;
   a V-shaped housing delimited by the tread, the wheel center and the retaining ring, for the insertion of an elastomer, in which the elastomer is formed by a plurality of V-shaped elastic blocks and the elastomer is compressed by the retaining ring towards the axis (R) of the wheel, the V-shaped housing comprising:
   a vertex,
   first and second inclined sections on which the V-shaped-elastic blocks are supported, the first and second inclined sections being connected at the vertex and extending away from the vertex in respective first and second directions, the first inclined section formed by an inclined surface of the retaining ring, the second inclined section formed by an inclined surface the wheel center,
   a first oblique wall joined to the first inclined section, the first oblique wall formed by an oblique surface of the retaining ring,
   a second oblique wall joined to the second inclined section, the second oblique wall formed by an oblique surface of the retaining ring,
   a first vertical wall joined to the first oblique wall, the first vertical wall being perpendicular to the axis, the first vertical wall being formed by a vertical surface of the retaining ring,
   a second vertical wall joined to the second oblique wall, the second vertical wall being perpendicular to the axis, the second vertical wall being formed by a vertical surface of the wheel center,
   a first horizontal wall joined to the first vertical wall, the first horizontal wall being parallel to the axis, the first horizontal wall being formed by a first horizontal surface of the tread,
   a second horizontal wall joined to the second vertical wall, the second horizontal wall being parallel to the axis, the second horizontal wall being formed by a second horizontal surface of the tread, and
   a radially inwardly projecting portion between the first and second horizontal walls, between the first and second vertical walls, and between the first and second oblique walls, the radially inwardly projecting portion formed by a projecting surface of the tread,
   wherein:
   the first oblique wall and the retaining ring are located on a first side of a line that intersects the axis (R), is perpendicular to the axis (R), and passes through the vertex, and the second oblique wall is located on a second side of the line opposite the first side,
   each of the first and second oblique walls forms an angle ($\alpha$) of between 48° and 52° with respect to the axis (R) of the wheel,
   the first inclined section is located on the first side of the line and disposed between the vertex and the first oblique wall,
   the second inclined section is located on the second side of the line and disposed between the vertex and the second oblique wall, and
   each of the first and second inclined sections forms an angle ($\beta$) of between 2° and 10° with respect to the axis (R) of the wheel.

2. The elastic wheel for railway vehicles according to claim 1, wherein the angle ($\alpha$) formed by the first and second oblique walls is 50° with respect to the axis (R) of the wheel.

3. The elastic wheel for railway vehicles according to claim 1, wherein the elastic blocks are compressed in the assembly arrangement between 20% and 30% with respect to a previous size.

* * * * *